LIGHT ENERGIZED INTERRUPTER CIRCUIT FOR TELEPHONE SYSTEMS

Filed March 23, 1964 2 Sheets-Sheet 1

INVENTOR.
STEPHEN L. MERKEL
BY John Howard Smith
ATTY.

LIGHT ENERGIZED INTERRUPTER CIRCUIT FOR TELEPHONE SYSTEMS

Filed March 23, 1964

INVENTOR.
STEPHEN L. MERKEL
BY John Howard Smith
ATTY.

United States Patent Office 3,316,408
Patented Apr. 25, 1967

3,316,408

LIGHT ENERGIZED INTERRUPTER CIRCUIT FOR TELEPHONE SYSTEMS

Stephen L. Merkel, Bay Village, Ohio, assignor to Lorain Products Corporation, a corporation of Ohio Filed Mar. 23, 1964, Ser. No. 353,945
7 Claims. (Cl. 250—208)

Figure 1:
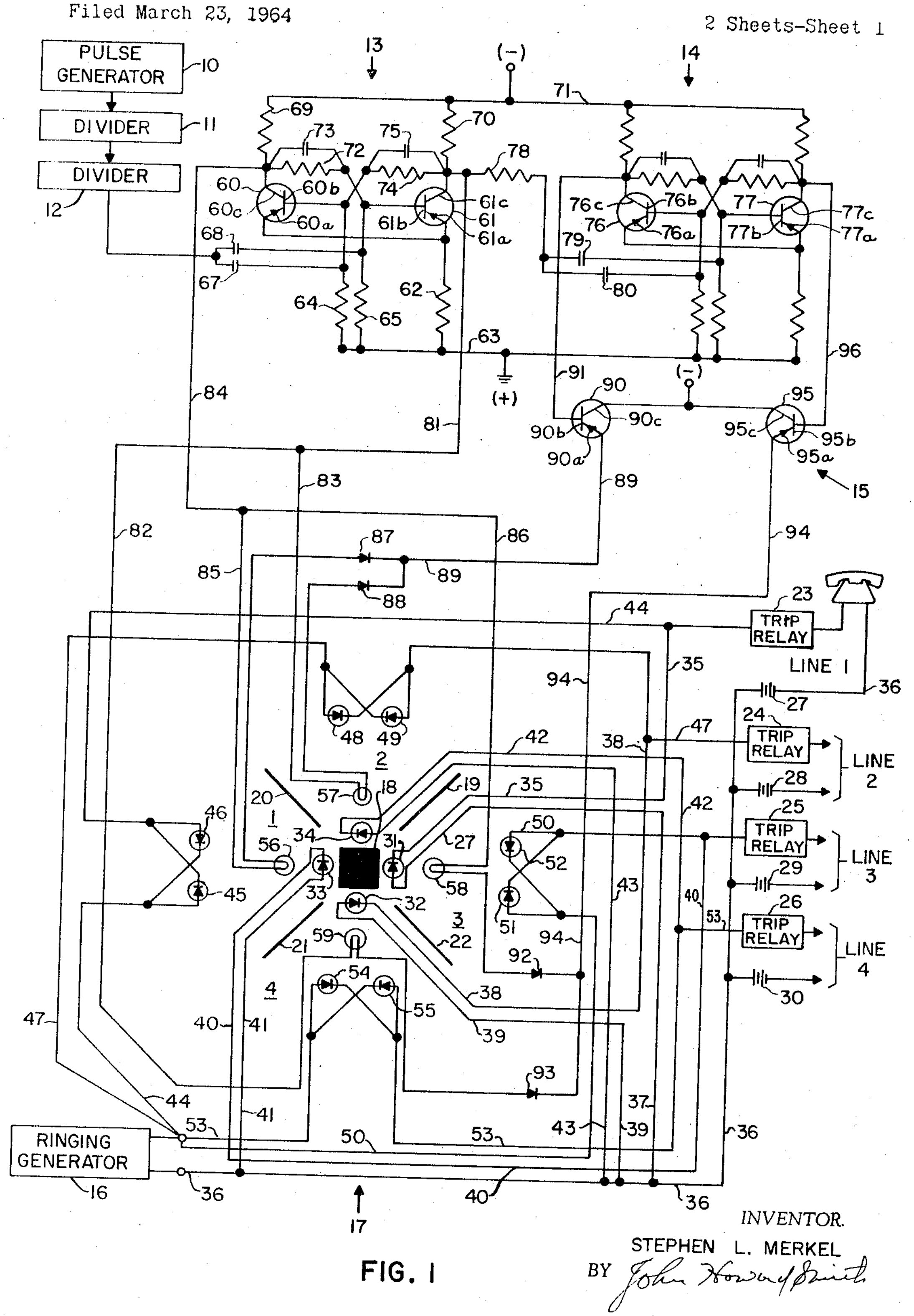

This invention relates to circuits utilizing light activiated switches and is directed more particularly to an arrangement of light sources, light activated switches and baffles for alternately and severally energizing each of a plurality of loads.

It is an object of the invention to direct light from light sources energized in a predetermined pattern to selected light sensitive switches to alternately and severally energize a plurality of loads.

It is another object of the invention to selectively and severally energize a plurality of loads and to activate auxiliary circuits associated therewith.

It is a further object of the invention to provide an arrangement of light sources, light sensitive switches and baffles wherein a minimum number of light sources are utilized to provide selective and several energization of a plurality of loads and auxiliary circuits.

Still another object of the invention is to provide a central baffle and radially arranged plate-like baffles displaced away from the central baffle and defining sectors, each sector including a light source, a light sensitive switch for energizing a load and a light sensitive switch for energizing the auxiliary circuit of another load whereby energization of the light source in any sector illuminates all the light sensitive switches in that sector and the auxiliary circuit light sensitive switches in the adjacent sectors.

An additional object of the invention is to provide an arrangement of baffles and light sensitive switches as described above and means for energizing the light sensitive sources in a predetermined pattern.

It is another object of the invention to provide a minimum number of light sensitive switches, baffles and light sources to energize loads and auxiliary circuits in a maximum number of permutations and combinations.

One present type of light sensitive switch which is adaptable to the present invention takes the form of a silicon semiconductor of the PNPN type which is responsive to illumination in that it is rendered electrically conducting when subjected to a ray of light. The device is electrically unidirectional and remains conducting until its source of current is de-energized. It will be understood, however, that cadmium-sulphide cells which are light activated, bidirectional, current conducting devices may be used in place of the light sensitive switches described herein particularly when alternating currents are involved.

Generally, in accordance with this invention, there is provided an interrupter circuit for energizing a plurality of loads, each associated with two photocells. One photocell is connected to energize its load and the other photocell is connected to de-energize that load. In accordance with one feature of this invention, lamps are provided for illuminating the energizing photocell of a selected load and for illuminating the de-energizing photocells of all of the other loads. The optical system may take the form of a central baffle disposed along an axis and baffle plates arranged radially about said axis with a gap between the central baffle and the baffle plates. In this arrangement, de-energizing photocells are arranged about the central baffle nearest its axis. The lamps are arranged about the central baffle further from its axis and between the baffle plates so as to illuminate all but one of de-energizing photocells. The energizing photocells are positioned opposite the lamps from the central baffle so that the baffle plates permit light from only one lamp to fall on each energizing photocell. In accordance with another feature of this invention, the lamps are sequentially energized by connecting them between a sector selecting section and a frequency divider so that the particular lamp which is energized depends on the states of both the sector selecting section and the frequency divider. The sector selecting section is driven to change states by the pulse frequency divider which, in turn, is driven by a pulse generator. In the case of binary circuitry, the sector selecting section and the frequency dividers are both flip-flop circuits having two states represented by one of two opposite outputs. The opposite outputs of one flip-flop are each connected to a pair of lamps. The members of each pair are connected to opposite outputs of the other flip-flop. These will therefore be four lamps, only one of which will be energized at a time.

Figure 2:
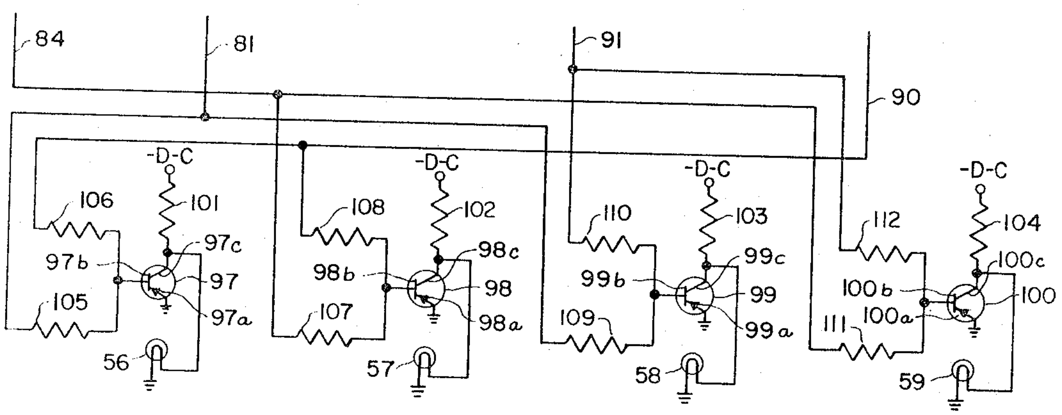
Figure 3:
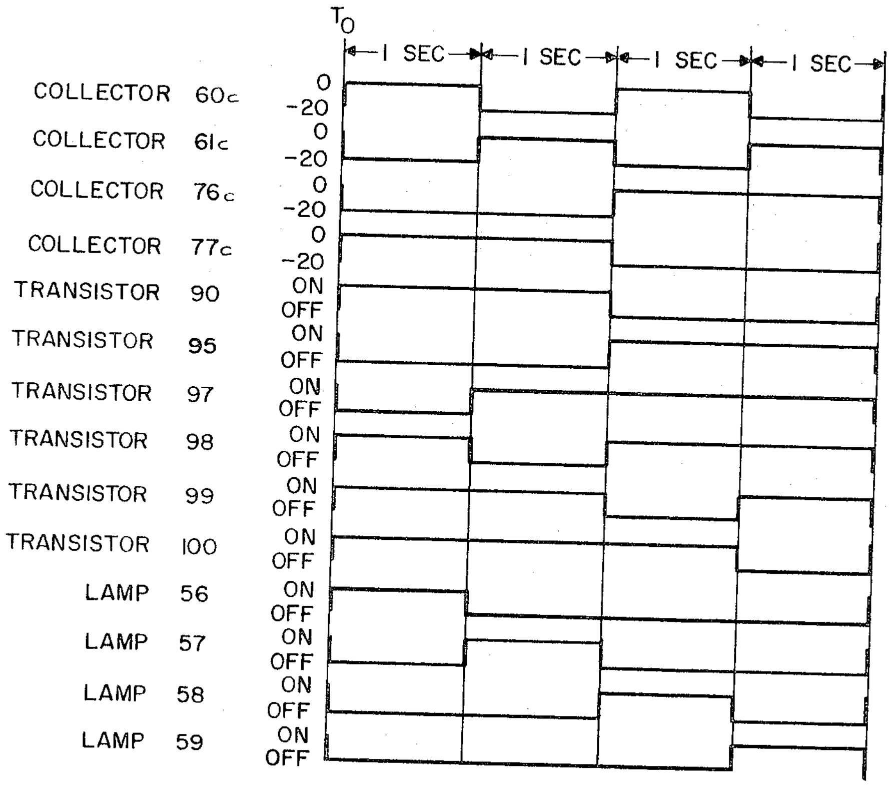

Other objects and advantages of the invention will become apparent from the following description and accompanying drawings in which:

FIGURE 1 is a schematic showing a physical arrangement of the lamps, light sensitive switches and baffles utilizing the invention, the electrical circuits which energize the lamps and the electrical networks of the load which are to be energized, FIG. 2 is a representation of modified circuitry which may be used with the circuitry of the invention and, FIGURE 3 is a pulse frequency chart illustrating the energization pattern of the transistors and incandescent lamps utilized in the exemplary circuit shown herein.

Referring to FIGURE 1, it will be seen that the invention may include a pulse generator 10, pulse frequency dividers 11, 12, 13 and 14, sector selecting section 15, a ringing generator 16 and a pattern generator 17. The pulse generator and pulse frequency dividers may be of the type shown in issued U.S. Patent 3,059,061. Pattern generator 17 is provided with an opaque central baffle 18 around which are radially arranged opaque, plate-like baffles 19, 20, 21 and 22. The baffle 18 shown herein is in the form of an upstanding post disposed longitudinally on a predetermined axis. Each of these plate-like baffles is located on a radius passing from the center and through respective corners of the central baffle 18 and is displaced from the central baffle along the radius as shown. The baffles 18, 19, 20, 21 and 22 may be considered as light beam directing means.

The area between baffles 20 and 21 may be defined as sector number 1, the area between baffles 19 and 20 as sector number 2, that between baffles 22 and 19 as sector number 3 and that between baffles 21 and 22 as sector number 4. By displacing the baffles 19, 20, 21 and 22, a small amount radially from central baffle 18, it will be seen that a light source placed in any sector will light that sector and a portion of each of the adjacent sectors but not the sector on the opposite side of the central baffle 18.

This configuration of baffles permits a plurality of light sensitive switch networks to be selectively energized by a minimum number of light sources. For example, to selectively supply power to a plurality of loads utilizing light sensitive switches, each load having an auxiliary circuit which includes a light sensitive switch, it will be seen that one lamp must be provided for each of the loads to control the light sensitive switch associated therewith, and one lamp must be provided for each of the auxiliary circuits to render conducting the light sensitive switches of the auxiliary circuits at the desired time.

With the arrangement of light sources which is provided, that is, one in each sector of the pattern generator, the desired energization pattern for the loads and for the auxiliary circuits is produced as will be seen presently.

An exemplary use of the invention is in a telephone system for supplying ringing current to subscriber's lines over a four second period or cycle. Each of the subscriber's lines is to be supplied with ringing current for a different one second period of the four second cycle. It will be understood, however, that the invention may be used wherever it is desired to selectively and severally energize a plurality of loads and auxiliary circuits.

Referring to FIGURE 1 it will be seen that the subscriber's lines indicated as line 1, line 2, line 3 and line 4 are provided with trip relays 23, 24, 25 and 26, respectively, and with trap batteries 27, 28, 29 and 30, respectively. Each trip battery serves to energize the associated trip relay through the ringing generator 16 in the event that the telephone set of the associated subscriber's line becomes conductive, as when the receiver is picked up, during the time that ringing current is being supplied to the load. However, during the off period or quiet interval of each of the subscriber's lines, when the current path between at least three of the subscriber's lines and the ringing generator is open, it will be seen that there is no path for a D.-C. flow from the positive pole of the trip battery to the associated trip relay. In order to provide a path for D.-C. to flow between each of the trip batteries and its associated trip relay during the quiet interval, if the subscriber's set should become conductive in nature, light activated or light sensitive switches 31, 32, 33 and 34 are provided for subscriber's lines 1, 2, 3 and 4, respectively. The light sensitive switches 31, 32, 33 and 34 are located in sectors 3, 4, 1 and 2, respectively, of pattern generator 17 and serve as first light sensitive means.

The light sensitive switch 31 is connected to the left end of trip relay 23, as shown in FIGURE 1, by a lead 35 and is also connected through a lead 37 to a lead 36 which serves to provide a common connection for the positive poles of the trip batteries and the lower terminal of ringing generator 16. The light sensitive switch 32 is connected to the left end of trip relay 24 by means of a lead 38 and to the common connection through a lead 39; the light sensitive switch 33 is connected to the left end of the trip relay 25 by means of a lead 40 and to the common connection through a lead 41; the light sensitive switch 34 is connected to the left end of trip relay 26 by means of a lead 42 and to the common connection through a lead 43.

From the foregoing connections, it will be seen that light sensitive switch 31, when conducting, provides a path for current from the positive terminal of the trip battery 27, through leads 36 and 37 to the left end of trip relay 23. By the circuitry which is provided, light sensitive switch 31 is rendered conducting during the three second quiet interval of subscriber line 1 and, in the event that a subscriber's telephone set becomes conductive, current will flow from the positive plate of the battery through lead 36, lead 37, light sensitive switch 31, lead 44, trip relay 23 and the resistive load to the negative side of the battery. This current flow energizes trip relay 23 and disconnects subscriber's line 1 from the source of ringing current. In a like manner, light sensitive switches 32, 33 and 34 provide D.-C. paths for subscriber's lines 2, 3 and 4, respectively during the quiet interval of each.

Ringing current for subscriber line 1 is provided by a lead 44 connected between the upper terminal of ringing generator 16 and trip relay 23 and including parallel connected light sensitive switches 45 and 46. Means for supplying ringing current to subscriber's lines 2, 3 and 4, respectively, are provided as follows: a lead 47 connected between the upper terminal of ringing generator 16 and trip relay 24 and including parallel connected light sensitive switches 48 and 49; a lead 50 connected between the upper terminal of ringing generator 16 and trip relay 25 and including parallel connected light sensitive switches 51 and 52; a lead 53 connected between the upper terminal of ringing generator 16 and trip relay 26 and including parallel connected light sensitive switches 54 and 55.

From the connections just established, it will be seen that if light sensitive switches 45 and 46 are rendered conducting by light beams, and assuming that the upper terminal of the ringing generator is positive with respect to the lower terminal thereof, current will flow from the upper terminal of ringing generator 16 through lead 44, light sensitive switch 45, trip relay 23, the subscriber's telephone set, trip battery 27 and the common lead 36 to the lower terminal of ringing generator 16. On the alternate half cycle the current will flow through light sensitive switch 46. Thus light sensitive switches 45 and 46 pass alternate half cycles of the A.-C. from the generator to the load. Similarly, it will be seen that ringing current is supplied to the subscriber line 2 when light sensitive switches 48 and 49 are rendered conducting, to subscriber line 3 when light sensitive switches 51 and 52 are rendered conducting and to subscriber line 4 when light sensitive switches 54 and 55 are rendered conducting. It will be understood that the light sensitive switch pairs 45 and 46, 48 and 49, 51 and 52, and 54 and 55 serve as second light sensitive means.

To the end that the subscriber's lines will be severally and sequentially supplied with one second duration pulses of ringing current, incandescent lamps 56, 57, 58 and 59 are provided in sectors 1, 2, 3 and 4, respectively. The incandescent lamp 56 is energized for the first second of the four second cycle; lamp 57 for the second second; lamp 58 for the third second and lamp 59 for the fourth second. When lamp 56 is energized, it will illuminate light sensitive switches 33, 45 and 46 in sector 1 and light sensitive switches 32 and 34 in sectors 4 and 2, respectively. However, the baffle arrangement provided prevents light from incandescent lamp 56 from illuminating any other light sensitive switches other than those indicated. Thus, when incandescent lamp 56 is energized, light sensitive switches 45 and 46 will be rendered conducting to supply ringing current to subscriber's line 1 and at the same time light sensitive switches 32, 33 and 34 will be rendered conducting to provide trip current paths for subscriber's lines 2, 3 and 4, respectively.

In a like manner, energization of incandescent lamp 57 will cause ringing current to be supplied to subscriber's line 2 through light sensitive switches 48 and 49 and will result in trip current paths being provided through switches 33, 34 and 31 for subscriber's lines 3, 4 and 1. Ringing current is supplied to subscriber line 3 when incandescent lamp 58 is energized and to subscriber line 4 when lamp 59 is energized. It will be clear that when ringing current is supplied to subscriber's line 3, light sensitive switches 34, 31 and 32 afford D.-C. trip current paths for subscriber's line 4, 1 and 2 and when ringing current is supplied to subscriber's line 4, light sensitive switches 31, 32 and 33 provide a D.-C. trip current path for lines 1, 2 and 3.

With the arrangement of incandescent lamps, baffles and light sensitive switches thus far described, it will be seen that subscriber's lines 1, 2, 3 and 4 are supplied with ringing current severally and sequentially for one second periods of the four second cycle. In addition, each subscriber's line is provided with a direct current path through which the trip relay may be energized from the trip battery should the subscriber's telephone set become conductive in nature during the three second period in which no ringing current is supplied.

As described previously, incandescent lamps 56, 57, 58 and 59 are energized for the first, second, third and fourth second periods, respectively, of a four second cycle. This energization pattern for the incandescent lamps is provided by pulse generator 10, frequency dividers 11, 12, 13 and 14 and sector selecting section 15. The pulse generator 10, by way of example, may supply 240 pulses of energy per minute to pulse frequency divider 11. Each of the pulse frequency dividers, which may be in the form of bistable multi-vibrators, halves the input frequency received by it with the result that the respective output signals of pulse frequency dividers 11, 12, 13 and 14 are 120, 60, 30 and 15 pulses per minute. It will be understood that these pulse frequency dividers can be arranged to give a wide variety of pulse patterns other than the particular pattern described herein.

Since the pulse frequency dividers 10, 11, 12 and 13 are identical bi-stable multivibrator circuits, only pulse frequency dividers 13 and 14 will be described in detail. Frequency divider 13 includes transistors 60 and 61 having emitter electrodes **60*a* and 61*b* and collector electrodes 60*c* and 61*c*, respectively. Bias for transistors 60 and 61 is provided by a resistor 62 which connects emitter electrodes 60*a* and 61*a* to a common ground lead 63. The base electrodes 60*b* and 61*b* are returned to ground 63 by resistors 64 and 65, respectively, and are also connected to the output signal of pulse frequency divider 12 through capacitors 67 and 68, respectively. The transistors 60 and 61 are energized through load resistors 69 and 70 connected between negative potential on lead 71 and collector electrodes 60*c* and 61*c*, respectively. The signal voltage developed on collector electrodes 60*c* is coupled to base electrode 61*b* by a resistor 72 which is paralleled by a capacitor 73. A resistor 74, paralleled by capacitor 75, couples the signal voltage of collector electrode 61*c* to base electrode 60*b***.

When pulse frequency divider 13 is first energized, one of the transistors 60 or 61 will turn fully on and the other will turn fully off due to the slight difference in characteristics of the transistors. This condition will prevail until a negative going wave front is supplied to base electrodes 60 and 61 from pulse frequency divider 12. This negative going wave front causes the non-conducting transistor (60 or 61) to turn on and a signal will be transmitted from the collector electrode of this transistor to the base electrode of the conducting transistor, causing the latter to turn off. The transistors of pulse frequency divider 13 will remain in this state until the next negative going wave front is applied to base electrodes **60*b* and 61*b*, whereupon the transistors 60 and 61** will switch or interchange conducting states as shown in FIGURE 3.

Since the signal applied to base electrodes **60*b* and 61*b* from pulse frequency divider 12 is 60 pulses per second and since transistors 60 and 61 switch only for negative going wave fronts, 30 pulses per minute are developed on collector electrodes 60*c* and 61*c*. The voltage pulses on collector electrodes 60*c* and 61*c* are 180 degrees out of phase as illustrated in FIGURE 3 from which it will be seen that transistors 60 and 61** each conduct for alternate one second periods.

The pulse frequency divider 14 is similar to the pulse frequency divider 13 and includes transistors 76 and 77 having emitter electrodes **76*a* and 77*a*, base electrodes 76*b* and 77*b* and collector electrodes 76*c* and 77*c*, respectively. The input signal for pulse frequency divider 14 is received from collector electrodes 61*c* through a resistor 78 and capacitors 79 and 80. Because the pulse frequency divider 14 halves the signal frequency received from pulse frequency divider 13, transistors 76 and 77** switch every two seconds as illustrated in FIGURE 3.

With the pulse frequency divider circuitry thus far described, a voltage pulse of one-half second duration is available at either of the collector electrodes, **60*c* or 61*c*, and a voltage pulse of two seconds' duration is available at either of the collector electrodes, 76*c* or 77*c*. As is well known, the voltage pulses on collector electrodes 60*c* and 61*c* are 180 degrees out of phase and the voltage pulses on collector electrodes on 76*c* and 77*c*** are also 180 degrees out of phase.

To the end that the incandescent lamps in pattern generator 17 will be energized severally in sequence, the voltage pulses appearing on collector **61*c* are applied to incandescent lamps 57 and 59 through leads 81, 82 and 83 and the voltage pulses appearing on collector 60*c* are supplied to incandescent lamps 56 and 58 by means of leads 84, 85 and 86. Current paths for incandescent lamps 56 and 57 are completed by diodes 87 and 88, respectively, and a lead 89 which is connected to an emitter electrode 90*a* of a transistor 90 of the sector selecting section 15. This transistor is energized by applying a negative 20 volt potential to collector electrode 90*c*. The conduction of transistor 90 is controlled by voltage pulses supplied to base electrode 90*b* from collector electrode 76*c* through a lead 91**.

Current paths for incandescent lamps 58 and 59 are completed by diodes 92 and 93 which are connected by means of a lead 94 to an emitter electrode **95*a* of a transistor 95. This transistor, also part of the sector selecting section 15, is energized by supplying negative 20 volts to collector electrode 95*c* and the conduction of transistor 95 is controlled by applying voltage pulses from collector electrode 77*c* to base electrode 95*b* through a lead 96**.

The diodes 87 and 88 prevent current flow between collector electrodes **60*c* and 61*c* through lamps 56 and 57 and the diodes 92 and 93 perform the same function with respect to lamps 58 and 59. Thus it will be seen that the diodes 87, 88, 92 and 93 serve to isolate lamps 56 and 58 from lamps 57 and 59**, respectively.

From the foregoing pulse frequency divider circuitry and incandescent lamp connections, it will be seen that no current can flow through incandescent lamps 56 and 57 unless transistor 90 is conducting. Similarly, current will not flow through incandescent lamps 58 and 59 unless transistor 95 is conducting. Because incandescent lamps 56 and 57 in sectors 1 and 2, respectively, cannot be energized unless transistor 90 is conducting and because incandescent lamps 58 and 59 in sectors 3 and 4 respectively, cannot be energized unless transistor 95 is conducting, transistors 90 and 95 comprise what may be termed a sector selecting section.

The incandescent lamps of pattern generator 17 are energized as shown in FIGURE 3. Assume that at time zero transistors 60 and 90 switch on. Current will then flow from ground lead 63 through resistor 62, the emitter-collector path of transistor 60, lead 84, lead 85, incandescent lamp 56, diode 87, lead 89 and the emitter-collector path of transistor 90 to the negative potential, thus causing incandescent lamp 56 to light. After one second, transistor 60 will shut off and transistor 61 will begin conducting in response to a negative going wave front from pulse frequency divider 12. Current now flows from ground lead 63 through resistor 62, the emitter-collector path of transistor 61, lead 81, lead 83, incandescent lamp 57, diode 88, lead 89 and the emitter-collector path of transistor 90 to the negative potential, causing incandescent lamp 57 to light.

At the end of the second second, transistors 60 and 61 again switch and transistors 76 and 77 also switch causing transistor 90 to turn off and transistor 95 to turn on. During this third second, current flows from ground lead 63 through a resistor 62, emitter-collector path of transistor 60, lead 84, lead 86, incandescent lamp 58, diode 92, lead 94 and the emitter-collector path of transistor 95 to negative potential. At the end of the third second, transistor 60 switches off and transistor 61 turns on, resulting in current flow from ground lead 63 through a resistor 62, emitter-collector path of transistor 61, lead 81, lead 82, incandescent lamp 59, diode 93, lead 94 and the emitter-collector path of transistor 95 to negative potential.

The voltages appearing on collector electrodes **60*c*, 61*c*, 76*c* and 77*c* are shown in FIGURE 3. This figure also illustrates the conducting pattern of transistors 90 and 95 and the energization pattern of incandescent lamps 56, 57, 58 and 59**.

FIGURE 2 illustrates circuitry which is a modification of that embodied in the invention and parts which correspond to those of FIGURE 1 have like numbers. With the circuitry shown in FIGURE 2, the conduction of each of the incandescent lamps is controlled by an associated transistor and no isolating diodes or sector selecting section are utilized.

The circuit used may, as shown in FIGURE 2, include transistors 97, 98, 99 and 100 having emitter electrodes 97*a*, 99*a* and 100*a*, base electrodes 97*b*, 98*b*, 99*b* and 100*b*, and collector electrodes 97*c*, 98*c*, 99*c* and 100*c*, respectively. The emitter electrodes 97*a*, 98*a*, 99*a* and 100*a* are all connected to common ground while negative D.-C. potential is applied to collector electrodes 97*c*, 98*c*, 99*c* and 100*c* through respective resistors 101, 102, 103 and 104. The incandescent lamps 56, 57, 58 and 59 are connected between collector electrodes 97*c*, 98*c*, 99*c* and 100*c*, respectively, and common ground.

From the foregoing connections, it will be seen that if transistor 97 of FIGURE 2 is fully conducting it is effectively in parallel with incandescent lamp 56 and, therefore, both sides of the incandescent lamp are at ground potential. However, when transistor 97 becomes nonconducting, current will flow from ground through the incandescent lamp 56 and resistor 101 to the negative D.-C. potential, thus causing the incandescent lamp to light. Lamps 57, 58 and 59 are energized or de-energized in the same way by the transistors to which they are connected.

In order to render the transistors 97, 98, 99 and 100 conducting or non-conducting in the desired sequence and pattern, base electrode 97*b* is connected to lead 81 through a resistor 105 and to lead 96 through a resistor 106; base electrode 98*b* is connected to lead 84 through a resistor 107 and to lead 96 through a resistor 108; base electrode 99*b* is connected to lead 81 through a resistor 109 and to lead 91 through a resistor 110; base electrode 100*b* is connected to lead 84 through a resistor 111 and to lead 91 through a resistor 112. With the circuitry described above, incandescent lamps 56, 57, 58 and 59 will be energized for the first, second, third, and fourth second periods of a four second cycle respectively. The energization pattern for the incandescent lamps and the conduction pattern for transistors 97, 98, 99 and 100 is shown in FIGURE 3.

From the foregoing description it will be seen that there is provided an arrangement of lamps, baffles and light sensitive switches which produce several and sequential energization of a plurality of loads and associated auxiliary circuits when the lamps are energized in a predetermined pattern. A wide variety of energization patterns for the lamps may be provided from pulse frequency divider circuits having varied division ratios. It will be understood that the number of sectors and associated components in the pattern generator may be increased or decreased to correspond to the number of loads and auxiliary circuits being utilized.

The embodiment shown herein are for explanatory purposes and may be changed or modified without departing from the spirit and scope of the invention as set forth in the claims appended hereto.

What I claim is:

1. In a device for severally and selectively energizing a plurality of loads and auxiliary circuits, a plurality of plate-like baffles arranged radially about an axis and displaced from said axis, each pair of plate-like baffles defining a sector, a central baffle disposed along said axis, the surface of said central baffle being disposed in spaced relationship with respect to said plate-like baffles, a plurality of selectively, severally energized lamps, at least one of said lamps being located in each of said sectors and substantially equidistant from adjacent plate-like baffles, first light sensitive element means for energizing a plurality of auxiliary circuits, at least one of said first light sensitive elements being located in each sector and at a lesser distance than said sector lamp from said axis whereby any sector lamp which is energized illuminates first light sensitive element means in the sector of the energized lamp and in adjacent sectors, second light sensitive element means for energizing a plurality of loads, at least one of said second light sensitive element means being located in each sector and at a greater distance than said sector lamp from said axis whereby each of said second light sensitive elements can be illuminated only by the sector lamp located in the same sector.

2. In a device for severally and selectively energizing a plurality of loads each having an associated auxiliary circuit, a plurality of lamps, means for energizing said lamps in a predetermined pattern, a first power source, a plurality of first light sensitive element means each connected between said first power source and a respective auxiliary circuit whereby when any of said first light sensitive element means is rendered conducting, power is supplied to the auxiliary circuit associated therewith, a second power source, second light sensitive element means each connected between said second power source and a respective load whereby when any of said second light sensitive element means is rendered conducting the load associated therewith is energized, light beam directing means arranged to direct light from a respective energized lamp to all of said first light sensitive element means except the first light sensitive element means connected between said first power source and the auxiliary circuit associated with said energized load, said light beam directing means being arranged to direct light from any energized lamp to one of said plurality of second light sensitive element means whereby one of said loads is energized.

3. In a device for severally and selectively energizing a plurality of loads each having an associated auxiliary circuit, a central baffle disposed longitudinally along a predetermined axis, plate-like baffles disposed radially to and parallel with said axis to define sectors and spaced at a distance from said central baffle, first light sensitive switch means positioned in each sector adjacent to said central baffle, a lamp disposed in each of said sectors at a distance from said central baffle such that light rays from a lamp in any sector impinge on first light sensitive switch means in that sector and adjacent sectors, second light sensitive switch means positioned in each sector at a greater distance from said central baffle than said lamps whereby light rays from a lamp in any sector impinge only on said second light sensitive switch means in said sector but are blocked from impinging on said light sensitive means in any other sector by adjacent plate-like baffles, a plurality of D.-C. sources, a plurality of D.-C. loads, means for electrically interposing said first light sensitive switch means between said respective D.-C. sources and loads, an A.-C. source, a plurality of A.-C. loads, means for electrically interposing said second light sensitive switch means between respective A.-C. loads and said A.-C. source, means for severally and sequentially energizing said lamps.

4. In a device for severally and selectively energizing a plurality of loads each having an associated auxiliary circuit, a central baffle disposed longitudinally along a predetermined axis, plate-like baffles disposed radially to and parallel with said axis to define sectors and spaced at a distance from said central baffle, first light sensitive switch means positioned in each sector adjacent to said central baffle, a lamp disposed in each of said sectors at a distance from said central baffle such that light rays from a lamp in any sector impinge on first light sensitive switch means in that sector and adjacent sectors, second light sensitive switch means positioned in each sector at a greater distance from said central baffle than said lamps whereby light rays from a lamp in any sector impinge only on said second light sensitive switch means in said sector but are blocked from impinging on said second light sensitive means in any other sector by said adjacent plate-like baffles, a plurality of D.-C. sources, a plurality of D.-C. loads, means for electrically interposing said first light sensitive switch means between said respective D.-C. sources and loads, an A.-C. source, a plurality of A.-C. loads, means for electrically interposing said second light sensitive switch means between respective A.-C. loads and said A.-C. source, a pulse generator, a plurality of pulse frequency dividers driven by said pulse generator, a sector selecting section driven by said pulse frequency dividers, an electrical power source connected to energize said pulse generator, said frequency dividers and said sector selecting section, means for connecting said lamps to one of said pulse frequency dividers and means for connecting said lamps to said sector selecting section whereby said lamps are energized severally and sequentially in a predetermined pattern.

5. In a device for severally and selectively energizing a plurality of loads each having an associated auxiliary circuit, a central baffle disposed longitudinally along a predetermined axis, plate-like baffles disposed radially to, and parallel with said axis to define sectors and spaced at a distance from said central baffle, first light sensitive switch means positioned in each sector adjacent to said central baffle, a lamp disposed in each of said sectors at a distance from said central baffle such that light rays from a lamp in any sector impinge on first light sensitive switch means in that sector and adjacent sectors, second light sensitive switch means positioned in each sector at a greater distance from said central baffle than said lamps whereby light rays from a lamp in any sector impinge only on said second light sensitive switch means in said sector but are blocked from impinging on said second light sensitive means in any other sector by adjacent plate-like baffles, a plurality of D.-C. sources, a plurality of D.-C. loads, means for electrically interposing said first light sensitive switch means between said respective D.-C. sources and load, an A.-C. source, a plurality of A.-C. loads, means for electrically interposing said second light sensitive switch means between respective A.-C. loads and said A.-C. source, a pulse generator, a first pulse frequency divider driven by said pulse generator and including at least a pair of alternately conducting switch means, a second pulse frequency divider driven by said first pulse frequency divider, a sector selecting section driven by said second pulse frequency divider and including a pair of alternately conducting switch means, a source of electrical power, means for connecting a first plurality of said lamps to one polarity of said source of electrical power through one of said alternately conducting switch means of said first pulse frequency divider, means for connecting a second plurality of said lamps to said one polarity of said source of electrical power through the other of said alternately conducting switch means of said first pulse frequency divider, means for connecting a third plurality of lamps to the other polarity of said source of electrical power through one of said alternately conducting switch means of said sector selecting section, said third plurality including some of said first plurality of lamps and some of said second plurality of lamps, means for connecting a fourth plurality of lamps to said other polarity of said source of electrical power through the other of said alternately conducting switch means of said sector selecting section, said fourth plurality including a number of said first plurality of lamps and a number of said second plurality of lamps.

6. In an electrical control system for energizing and de-energizing electrical networks in accordance with a predetermined pattern of sequential operation, in combination, a plurality of lamps, a plurality of light sensitive elements of the type adapted to change in electrical characteristics in accordance with the intensity of light impressed thereon, baffle means disposed between selected light sources and light sensitive elements in accordance with said predetermined interruption pattern and networks operatively associated with said light sensitive elements to be energized and de-energized thereby, a pulse generator, a plurality of pulse frequency dividers driven by said pulse generator, a sector selecting section driven by one of said pulse frequency dividers, an electrical power source connected to energize said pulse generator, said frequency dividers and said sector selecting section, means for connecting said lamps to one of said pulse frequency dividers, means for connecting said lamps to said sector selecting section, whereby said lamps are energized severally and sequentially in predetermined pattern.

7. In an electrical control system for energizing and de-energizing electrical networks in accordance with a predetermined pattern of sequential operation, in combination, a plurality of lamps, a plurality of light sensitive elements of the type adapted to change in electrical characteristics in accordance with the intensity of light impressed thereon, baffle means disposed between selected light sources and light sensitive elements in accordance with said predetermined interruption pattern and networks operatively associated with said light sensitive elements to be energized and de-energized thereby, a pulse generator, a first pulse frequency divider driven by said pulse generator and including at least a pair of alternately conducting switch means, a second pulse frequency divider driven by said first pulse frequency divider, a sector selecting section driven by said second pulse frequency divider and including a pair of alternately conducting switch means, a source of electrical power, means for connecting a first plurality of said lamps to one polarity of said source of electrical power through one of said alternately conducting switch means of said first pulse frequency divider, means for connecting a second plurality of said lamps to said one polarity of said source of electrical power through the other of said alternately conducting switch means of said first pulse frequency divider, means for connecting a first set of lamps to the other polarity of said source of electrical power through one of said alternately conducting switch means of said sector selecting section, said first set including some of said first plurality of lamps and some of said second plurality of lamps, means for connecting a second set of lamps to said other polarity of said source of electrical power through the other of said alternately conducting switch means of said sector selecting section, said second set including a number of said first plurality of lamps and a number of said second plurality of lamps.

References Cited by the Examiner

UNITED STATES PATENTS

| | | | |
|---|---|---|---|
| 2,975,410 | 3/1961 | Groce et al. | 340—347 |
| 3,087,068 | 4/1963 | Bowerman | 250—209 |
| 3,161,867 | 12/1964 | Isborn | 250—213 |
| 3,222,527 | 12/1965 | Low et al. | 250—209 |

RALPH G. NILSON, *Primary Examiner.*

J. D. WALL, *Assistant Examiner.*